April 15, 1969   L. SVENSSON   3,438,568
DAMPER ARRANGEMENTS FOR OIL-BURNER ASSEMBLIES
Filed May 22, 1967
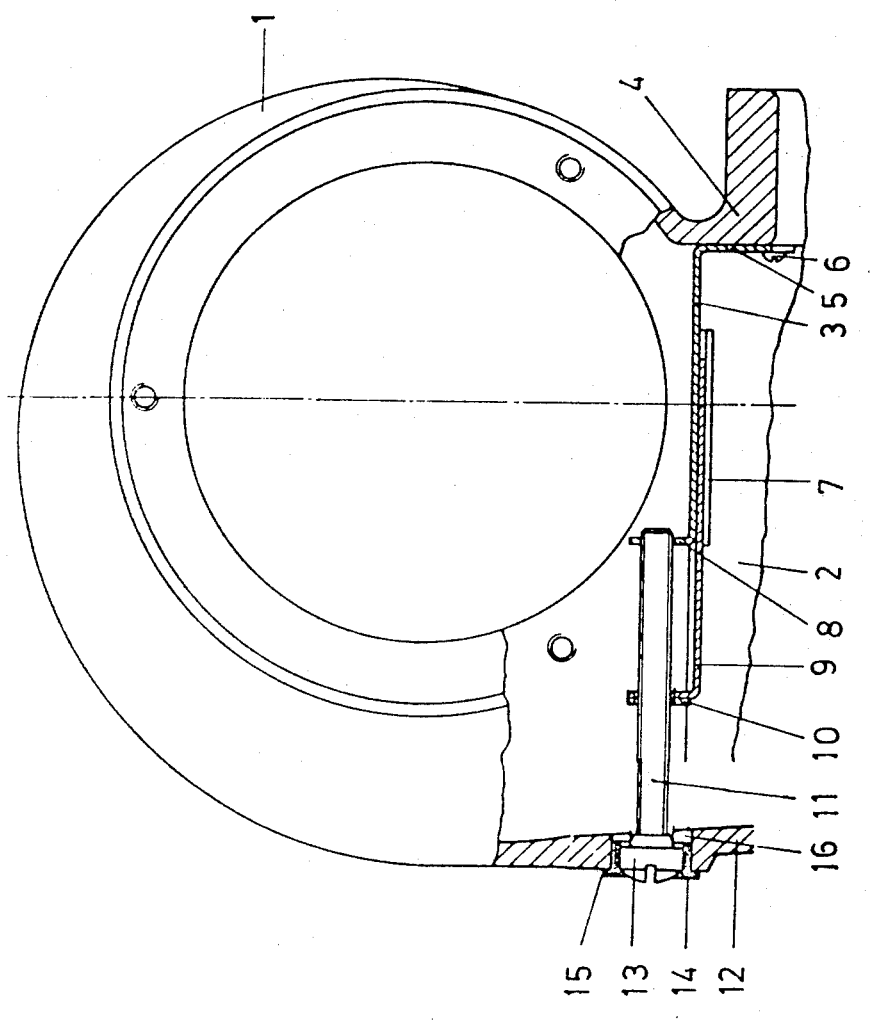
INVENTOR
LARS SVENSSON
BY
ATTORNEYS ![](United States Patent Office)

3,438,568
Patented Apr. 15, 1969

3,438,568
DAMPER ARRANGEMENTS FOR OIL-BURNER ASSEMBLIES
Lars Svensson, Krokek, Sweden, assignor to B. Palm & Co. Aktkiebolag, Norrkoping, Sweden, a Swedish company
Filed May 22, 1967, Ser. No. 640,167
Int. Cl. F04d 27/00, 7/00
U.S. Cl. 230—114                2 Claims

ABSTRACT OF THE DISCLOSURE

An improved damper arrangement for use with oil-burners in which fixed and movable damper plates are arranged to obturate in varying degrees the passage from the blower to the air-feed pipe, with the movable plate being controlled by externally accessible motion-transmission means.

---

The present invention relates to a damper arrangement for an oil burner assembly of the kind including a radial blower housing and an air-feed pipe arranged tangentially in relation to a blower rotor located eccentrically in the housing, the exit of said pipe being directed towards that side of the housing which has the smallest radius.

The damper arrangement in accordance with the invention incorporates a fixed, flat damping plate which is so arranged in an aperture between a blower housing and an air-feed pipe, parallel with the longitudinal axis of said pipe and fixed to that end of said aperture which faces the exit of said air-feed pipe, that it covers at least half said aperture; a second flat damping plate, which abuts slidably against the aforementioned damping plate and is so guided by guides arranged along the edges of the fixed plate, that it can close off the whole of the aperture; a spindle parallel with said damping plates, which spindle is rotatably mounted in the external wall of the blower housing and in a lug extending at right-angles from the end of the fixed damping plate, part of which spindle located between the wall of the blower housing and the lug, being provided with threads which engage with corresponding threads in a lug extending at right-angles from the slidable damping plate; and arrangements for rotating the spindle from outside the blower housing.

The invention will now be described with reference to the attached drawing in which the sole figure illustrates a blower housing for an oil burner apparatus, with an embodiment of a damping arrangement in accordance with the invention in partial section taken at right-angles to the blower axis.

A housing 1 for a radial blower used in an oil burner assembly is provided with an exit aperture or outlet 2 leading to a burner tube (not shown). In the exit aperture 2 a flat damping plate 3 is so arranged that it covers that half of the exit aperture 2 located nearest the minimum radius of the housing 1, and is located tangentially in relation to a blower rotor which is not shown. The plate 3 is for example fixed to wall 4 of the exit aperture by means of a flange 5 and associated screws 6.

The plate 3 is equipped along its edges with guides 7 and at that of its ends opposite the flange 5 with a lug 8 projecting at right-angles thereto.

A second damping plate 9 is slidably arranged between the guides 7 and is designed to be movable to cover over the remainder of the aperture 2. The damping plate 9 is equipped at that of its ends remote from the flange 5, with a lug 10 projecting towards the same side as the lug 8, and the lug 10 contains a threaded hole.

A threaded spindle 11 is screwed into the hole and is mounted at one end in a rotatable and axially fixed fashion in a corresponding hole in the lug 8. The spindle 11 is provided at its external end with a cylindrical head 13 which is located in a large clearance hole 16 formed in wall 12 of the blower housing. As a consequence, the damper can be inserted as a preassembled unit in the exit aperture 2 of the blower housing 1, with the head 13 being inserted into the hole 16, whereupon the flange 5 is fixed to the wall 4 and a sleeve 14 fitting into the hole 16 and around the head 13 with a running fit is inserted into said hole 16 over the head 13 so that through the medium of a collar 15 it bears against the outside of the wall 12 of the blower housing.

The invention is not to be confined to any strict conformity to the showings in the drawing but changes or modifications may be made therein so long as such changes or modifications mark no material departure from the spirit and scope of the appended claims.

I claim:
1. In an oil burner blower housing having an outlet, flange means bounding one side of the outlet and aperture defining means, a damper comprising in combination, a first plate secured to said flange means and extending from said flange means into said outlet, a second plate slidably disposed on said first plate, means for slidably moving said second plate with respect to said first plate for varying the size of the said outlet, and sleeve means in said aperture defining means whereby said means for slidably moving said second plate is received in said sleeve means and is capable of being moved relative to said sleeve means for thereby varying the size of said outlet.

2. The combination as claimed in claim 1 in which said sleeve means is provided with a collar whereby the sleeve means is adapted to abut against said housing.

References Cited

UNITED STATES PATENTS

| 640,345 | 1/1900 | Wilberforce. |
| 2,316,224 | 4/1943 | D'Elia. |
| 2,446,744 | 8/1948 | De Lancey. |
| 3,115,299 | 12/1963 | Goeth et al. |

FOREIGN PATENTS

| 114,415 | 1917 | Great Britain. |

JAMES W. WESTHAVER, *Primary Examiner.*